(12) United States Patent
Schaaf et al.

(10) Patent No.: US 10,498,871 B2
(45) Date of Patent: Dec. 3, 2019

(54) SPEECH STATION FOR INTERCOM NETWORK

(71) Applicant: RIEDEL Communications International GmbH, Wuppertal (DE)

(72) Inventors: Stephan Schaaf, Oberstadtfeld (DE); Hubert Sieben, Wuppertal (DE); Thomas Riedel, Wuppertal (DE)

(73) Assignee: RIEDEL COMMUNICATIONS INTERNATIONAL GMBH, Wuppertal (DE)

( * ) Notice: Subject to any disclaimer, the term of this patent is extended or adjusted under 35 U.S.C. 154(b) by 0 days.

(21) Appl. No.: 16/105,105

(22) Filed: Aug. 20, 2018

(65) Prior Publication Data

US 2019/0166237 A1    May 30, 2019

(30) Foreign Application Priority Data

Nov. 29, 2017  (DE) .................. 10 2017 128 282
Mar. 28, 2018  (DE) .................. 10 2018 107 447

(51) Int. Cl.
*H04M 1/02*    (2006.01)
*G06F 3/16*    (2006.01)
(Continued)

(52) U.S. Cl.
CPC .......... *H04M 1/0291* (2013.01); *G06F 3/165* (2013.01); *H04M 1/23* (2013.01); *H04M 9/00* (2013.01); *H04M 11/025* (2013.01); *H04R 1/00* (2013.01)

(58) Field of Classification Search
CPC .......... H04M 1/02; H04M 9/001; H04M 1/23; H04M 1/0291; H04M 11/025; H04M 1/6505; G06F 3/16
(Continued)

(56) References Cited

U.S. PATENT DOCUMENTS 5,210,520 A * 5/1993 Housley ............... G08B 3/10
                                          340/326
6,735,307 B1   5/2004 Völckers
(Continued)

FOREIGN PATENT DOCUMENTS

DE    102014104811 A1   10/2015
EP    2060968 A1        5/2009
(Continued)

OTHER PUBLICATIONS

WIKIPEDIA.ORG/W/INDEX.PHP?TITLE=Sprechanlage&oldid=167504447.
https://de.wikipedia.org/w/index.php?title=telefonanlage&oldid=168223548.
D40AB_UserGuide-V2_144x204_Ger.indd.

*Primary Examiner* — Melur Ramakrishnaiah
(74) *Attorney, Agent, or Firm* — Andrew Wilford (57) ABSTRACT

The invention relates, among others, to a communication station (10) for an intercom network (11), comprising a housing (12) with a housing front (13) and a housing rear side (14), wherein a plurality of operating elements (15a, 15b, 15c) and at least one display (16a, 16b, 16c, 16d) are on the housing front, the display being configured as a touchscreen display, wherein the operating elements comprise a plurality of selector keys (17a, 17b, 17c, 17d), wherein the communication station as a result of an operator actuating a selector key provides a direct listening and/or speaking connection to another selected communication station (18a, 18b) of the intercom network, in particular via a switching station (19), wherein in a first function state (68) of the display information (A; B, C) of a first kind can be displayed and/or data (A; B; C) of a first kind can be entered on the display, the information and/or data relating to at least one operating element.
The particular characteristic of the invention consists in that the display (16c) can be shifted between a rest position (66) and a switching position (67), wherein as a result of shifting the display into the switching position, the display assumes
(Continued)

a second function state, in which information (D; E; F) of a second kind can be displayed and/or data (D; E; F) of a second can be entered on the display, the information and/or data relating to at least one operating element.

15 Claims, 7 Drawing Sheets

(51) Int. Cl.
    *H04M 1/23*     (2006.01)
    *H04M 9/00*     (2006.01)
    *H04M 11/02*     (2006.01)
    *H04R 1/00*     (2006.01)

(58) Field of Classification Search
    USPC .... 379/428, 167.01, 167.02, 167.05, 167.07, 379/167.12
    See application file for complete search history.

(56) References Cited

U.S. PATENT DOCUMENTS

7,400,716 B1 *    7/2008    Gibson, Sr. ........ H04M 1/0291
                                                              379/167.01

2005/0052425 A1    3/2005    Zadesky et al.
2005/0129204 A1 *    6/2005    Arcaria ................. H04M 9/001
                                                       379/167.01
2010/0097322 A1 *    4/2010    Hu ...................... G06F 3/04883
                                                          345/173
2011/0032219 A1    2/2011    Aoyama et al.
2014/0315596 A1 *    10/2014    Otto ..................... H04N 7/141
                                                          455/552.1
2015/0319407 A1 *    11/2015    Frankel ................. H04N 7/186
                                                          348/14.02
2016/0050505 A1    2/2016    Riedel
2018/0166836 A1    6/2018    Fritz
2018/0198635 A1    7/2018    Lee
2018/0288207 A1    10/2018    Riedel
2018/0288527 A1    10/2018    Riedel
2018/0288595 A1    10/2018    Lee

FOREIGN PATENT DOCUMENTS

EP               2211256 A1      7/2010
JP              2000200141 A     7/2000
JP              2011-059988 A     3/2011

* cited by examiner

SPEECH STATION FOR INTERCOM NETWORK

The invention relates to a communication station for an intercom network according to claim 1.

The applicant has been developing and manufacturing such communication stations for intercom networks as well as corresponding intercom networks for more than three decades.

For an explanation of the function and intended uses of a communication station, and for the purpose of avoiding repetitions reference should be made to the following protective rights applications of the applicant: DE 10 2014 011 963 [US 2016/0050505] and the subsequently published patent applications DE 10 2017 107 148 [US 2018/0288595], DE 10 2017 107 150 [US 2018/0198635], DE 10 2017 106 946 [US 2018/0166836], DE 10 2017 116 002 [2018/0288527], DE 10 2017 116 273 [US 2018/0288207]. For the purpose of avoiding repetitions reference is made to these applications, the contents of which is hereby included in the content of the present patent application, also for the purpose of making reference to individual characteristics and further for the purpose of including individual characteristics contained in the described patent applications in the claims of the present patent application.

With a communication station of the generic state-of-the-art kind, as manufactured, developed and introduced by the applicant on the market in large quantities, a plurality of operating elements and displays are on a front side of the housing of the communication station. The operating elements, displays and also the ports on the front side, such a microphone port or headset port, are in close proximity to one another. The available surface along which the operating elements, displays and also ports can be on the front side, is basically limited. For example, the dimensions of the housing of the communication station may be fixed because the communication station has to be accommodated in a predefined mounting frame or in a holder, e.g. a so-called rack. However, the internal dimensions of the compartments in the rack for receiving the communication station are frequently standardized or predefined.

Basically, the problem therefore consists in arranging and accommodating a plurality of operating elements that in particular are designed so as to be programmable so that different functions can be assigned to them, and also in arranging and accommodating a plurality of displays on the front side of the communication station. The displays can be used for indicating information which relates to at least one, advantageously to a number of operating elements. It is already known to configure the displays as touchscreen displays so that they can be used not only for displaying information but also for inputting data. For example, the input may consist in assigning a certain functionality to a certain operating element, in cancelling this functionality or in storing a certain piece of information relating to a certain operating element.

Based on a state-of-the-art communication station the requirement of the invention consists in further developing the communication station in such a way that it is possible to achieve a particularly close arrangement of the operating elements, displays and/or ports on the front side of the communication station and/or to enhance the operating comfort of the communication station.

The requirement of the invention is met by the characteristics of claim 1, in particular by those of the characterizing part, and the invention is therefore characterized in that the display can be shifted between a rest position and a switching position, wherein as a result of shifting the display into the switching position the display assumes a second function state, so that information of a second kind can be displayed and/or data of a second kind can be entered, the information and/or data relating to at least one operating element.

The principle of the invention essentially consists in designing the display configured as a touchscreen display so that it can be shifted. The display can be shifted between a rest position and a switching position. As a result of shifting the display into a switching position the display can assume a second function state. In the second function state information of a second kind can e.g. be indicated on the display. Alternatively or additionally data of a second kind can be entered on the display that is now in the second function state. The displayable information of the second kind/the data of the second kind which can be entered relates to at least one operating element. As a result of the possibility of shifting the display from a rest position into a switching position a further function level of the touchscreen of the display can be reached.

When the display is in a rest position or in a normal position, the display is in a first function state. In this first function state the display can be used like a conventional display. The display can indicate information of a first kind and allow the input of data of a first kind. The displayed first-kind information/the first-kind data entered relates to at least one operating element. It is also covered by the invention that information of a first kind or data of a first kind can be set up to relate to at least one operating element, for example by means of a control or a computing unit of the communication station that is associated with the display.

For example, the communication station may comprise a plurality of selector keys, wherein the majority may be divided into different groups. Each display may be assigned to a respective group of the selector keys. In a first function state the display, in particular when spatially directly assigned to the operating elements of the selector keys, may display all information of a first kind that directly relates to the operating element. For example, the information of the first kind may contain or comprise the name of the selector key or a number of the selector key or information about another communication station, to which the present communication station can be connected when a certain selector key is being actuated. Data of a first kind can be input on the display, when the display is in the first function state. For example, by actuating the touchscreen display such that a certain display field is touched, it is possible to retrieve a certain operating element or a certain selector key, wherein then, for example, supplementary information such as a loudness value or a label or number of the selector key or information about this selector key can be entered or changed on the display via this selector key.

According to the invention however, the display can be manually actuated, for example shifted from the rest position into a switching position, by exerting a force along a direction of a normal vector which extends normally to the planar display. The switching position can be detected by a sensor and this detection can be reported to a control. The control of the communication station can then cause the display, as it reaches the switching position, to be transferred from a first function state into a second function state. As soon as the display has reached its second function state information of a second kind can be displayed on the display. In other words, another information level can for example be reached. Also, with the display in the second function state, data of the second kind may be entered, i.e.

data other than of the first kind. This opens the possibility of using the display in a more varied manner than has been customary up to now. By actuating a switch on the display, i.e. by shifting the display from a rest position into a switching position, it can assume different function states or control levels.

Advantageously the display is biased in direction of its rest position. Therefore after reaching the switching position it can, as soon as the shifting force exerted by the user reduces or ceases, automatically return into the rest position. Alternatively it may be provided that the display assumes its switching position and has e.g. to be re-actuated in order to return to its rest position.

It is also possible and covered by the invention if not only a single actuation of the display in terms of a shift into the switching position is detectable by the sensor, but repeated actuation can be detected within a given time span. For example, it may be provided that by shifting the display twice within in short time span into the switching position, a further function level corresponding to a third function state of the display is reached. Further repeated actuations of the display, e.g. actuations repeated three or four times, in terms of a shift from the rest position into the switching position, may be detected in a similar manner and lead to further function states of the display.

The communication station according to the invention is a device which is provided exclusively for use in an intercom network. An intercom network is used for the transmission of audio signals between subscribers at different communication stations. These are so-called point-to-point connections. All lines pass through a switching station which connects, administrates and manages the line paths.

The communication station comprises a housing which for example may consist of metal. It comprises a housing front, i.e. a front side, and opposite thereto a housing rear side. With the communication station according to the invention a plurality of operating elements is on the housing front. These may, for example, be selector keys or also other operating elements such as potentiometers, rotary controls, rotary knobs, push buttons or the like. Further, the communication station has one or a number of displays on it. At least one display is configured as a touchscreen display. A touchscreen display allows the user the display information, but also to input information by touching it or by bringing a finger close to be display.

According to the invention the communication station has a number of operating elements which include a number of selector keys. The name selector key is used for elements which can be shifted from a rest position into a working position. Preferably selector keys according to the invention can be shifted from a rest position called e.g. the center position, in two different movement directions, in order to reach a first or a second switching position or working position. In particular, these may be selector keys that depending on the switching state perform either a hearing (listening) function or a talking (speaking) function.

As a result of actuating a selector key the communication station provides a direct listening and/or speaking link to a selected other communication station of the intercom network, in particular via a switching station. Actuating a selector key therefore means directly addressing a subscriber of another communication station.

Such communication stations and intercom networks are used for example in the events sector, e.g. at live events such as sports and music events.

The invention covers communication stations which are connected via a switching station to other communication stations of the intercom network, as well as communication stations which are connected directly, i.e. not via a switching station, to other communication stations of the intercom network.

When in a first function state or inactive state the display can be used for displaying information of a first kind. The display can also be used, provided it is in a first function state, for entering data of a first kind. The information of the first kind/the data of the first kind refers to or relates to at least one operating element or is associated with at least one operating element. This means that the information or data comprises or is associated with parameters or properties or functions or uses or regulations or intervening options of the operating element.

For example the information or data may include names, numbers, labels, settings, parameters such as loudness values, brightness values, address values or other information.

According to one advantageous implementation of the invention the housing is shaped as a cube or essentially as a cube. This permits taking recourse to conventional shapes for housings of communication stations.

According to a further advantageous design of the invention at least one operating element is designed to be programmable. This means that at least one alterable function or property or one parameter value can be assigned to at least one operating element based on the input of an operator or an instruction from the switching station.

According to a further advantageous design of the invention the communication station comprises a number of displays configured as touchscreen displays. Each of these can be shifted between a rest position and a switching position. Advantageously a display has a group of operating elements assigned to it.

According to a further advantageous design of the invention the shifting of the display into the switching position is detectable by at least one sensor. This can cause generation of a signal which is forwarded to a control of the communication station.

According to a further advantageous design of the invention the communication station comprises a control which is connected to the sensor. This means that switching and activating of the display can be effected centrally, initiated by the control.

The control may for example comprise a microprocessor on which for example a computer program is running.

According to a further advantageous design of the invention the control switches the display from its first function state into its second function state. Vice-versa the control can switch the display from the second function state into the first function state. Switching takes for example place, when the sensor detects that a switching position or the rest position has been reached.

It may also be provided that at the end of a certain time span after the display has reached the switching position, the control initiates switching the display back from the second function state into the first function state.

According to one advantageous design of the invention the control is able to switch the display from a first function state into a second function state for only a very brief shift of the display into the second position. Reaching the switching position for just a short time is sufficient by e.g. just lightly touching the display.

The fact that the display has reached the switching position may be indicated in a tactile manner to the operator who has shifted the display from the rest position into the switching position. This is the signal for the user that the switching position of the display has been reached.

Alternatively or additionally it may be provided that the control performs the switching also when the display remains continuously in the switching position/reaches the switching position and then remains there for a certain period of time. The dwell time of the display in the switching position may, according to one embodiment, also be detected by the sensor and/or processed and used by the control. As such it is also covered by the invention if the control, when the display initially reaches the switching position, switches the display from a first into a second function state, but if the display continuously remains in the switching position for longer than a specified dwell time, e.g. for one or two seconds, ascertains this dwell state and then immediately thereafter moves and switches the display from the second into a third or other function state. Similarly, when exceeding further threshold values of a minimum dwell time of e.g. three or four seconds during which the display remains in the switching position, the control can cause the display to be transferred and switched into a further, e.g. the fourth, fifth or sixth function state.

Similarly with one embodiment of the invention provision may be made for the control to perform switching the display from its first function state into its second function state for a single or a repeated shift of the display into the switching position.

According to one variant of the invention the display is shiftable in its entirety. Depending on the dimensions, size and construction of the display this can be shifted as a whole. According to an alternative implementation of the invention the display may also be designed so as to be only partially shiftable, i.e. only parts or sections of its extension may be designed to be shiftable.

The shifting movement of the display may be effected along a straight. The straight may be formed by a normal vector which is perpendicular to a planar surface of the housing front. It is also covered by the invention, if the shifting movement of the display can be performed along another path, e.g. a path inclined relative to the housing front or along a curved path. It is also covered by the invention if the display, in order to perform the shifting movement, is inclined or tilted or swivelled.

Further advantages of the invention are revealed in the sub-claims not cited as well as in the description hereunder of the embodiments shown in the drawings, in which

Embodiments of the invention will now be explained by way of example in the figure description hereunder and also with reference to the drawings. For the sake of clarity, and insofar as different embodiments are concerned, identical or comparable parts or elements or areas are marked with the same reference symbols, partially by adding lower case letters.

Features described with reference to only one embodiment may in terms of the invention also be provided in any other embodiment of the invention. Embodiments modified in this way, even if not shown in the drawings, are also covered by the invention.

All disclosed features are, on their own, essential to the invention. The disclosure content of the associated priority documents (copy of prior application) as well as of the cited publications and described devices of the state of the art are fully included, also for the purpose of including individual or several features of these documents in one or more claims of the present application.

Figure 1:
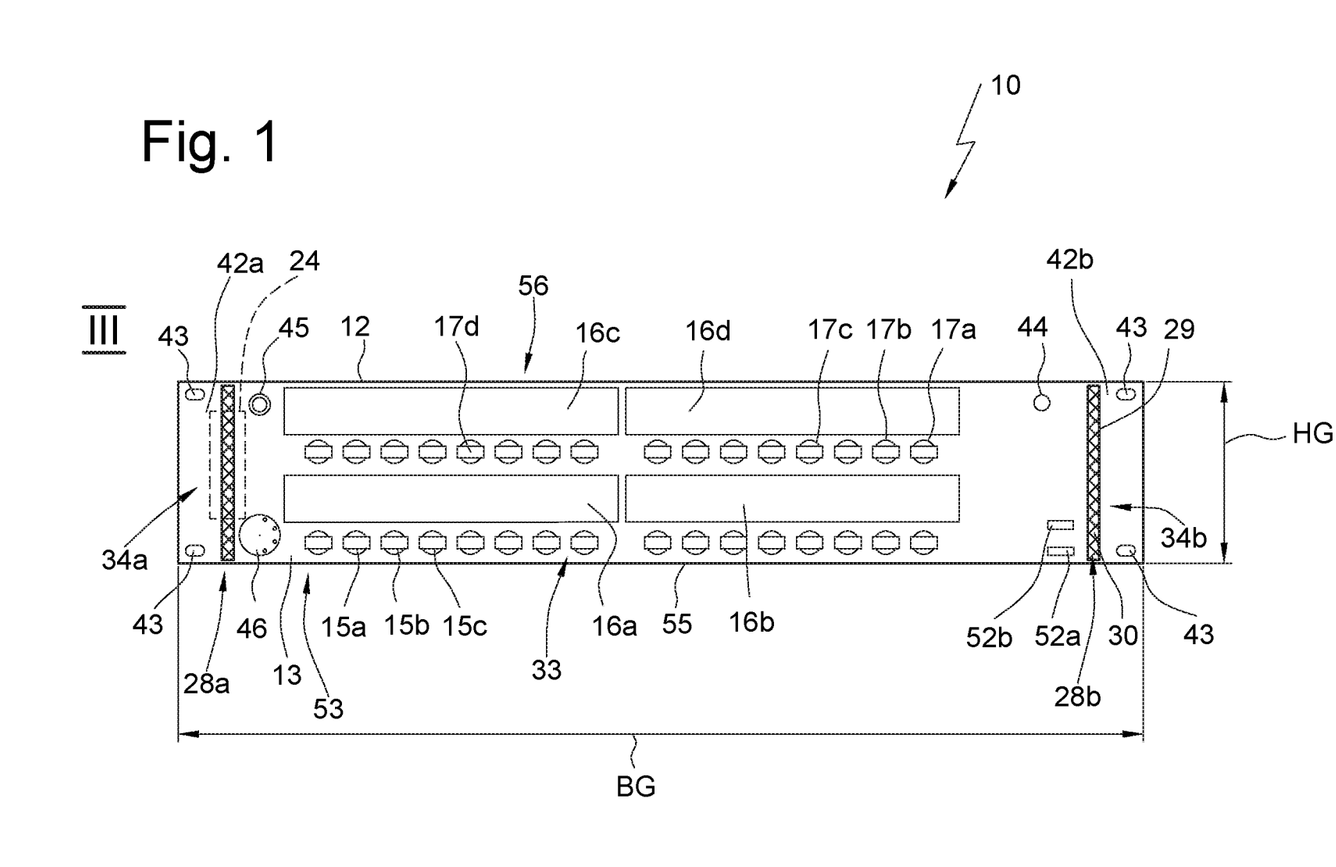
FIG. 1 shows a first exemplary embodiment of a communication station according to the invention in a partially cut schematic front view which depicts the housing front.
Figure 3:
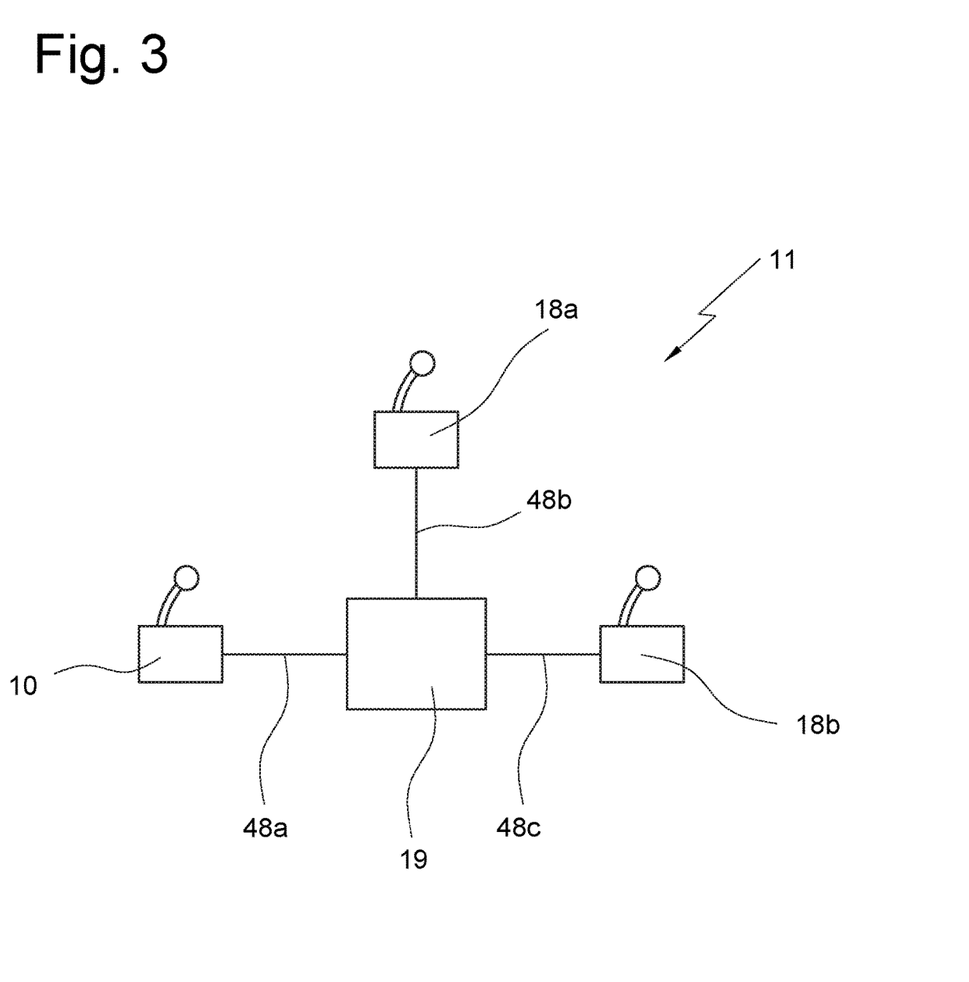
FIG. 3 shows, in a schematic block-diagram-type simplified illustrative view, an embodiment of an intercom network with three communication stations according to the invention.

FIG. 1, in a very schematic front view, shows an exemplary embodiment of a communication station 10 according to the invention. The communication station is used in an intercom network 11 as indicated in FIG. 3. Such an intercom network 11 comprises a number of communication stations 10, 18*a*, 18*b* that are each connected to a switching station 19 via connection lines 48*a*, 48*b*, 48*c*. Audio networks of this kind are used, for example, in live events, but also in the field of entertainment technology, e.g. for theater stages or for comparable applications.

Each of the communication stations 10, 18*a*, 18*b* of the intercom network 11 as per FIG. 3 may include a communication station as per FIG. 1.

Figure 2:
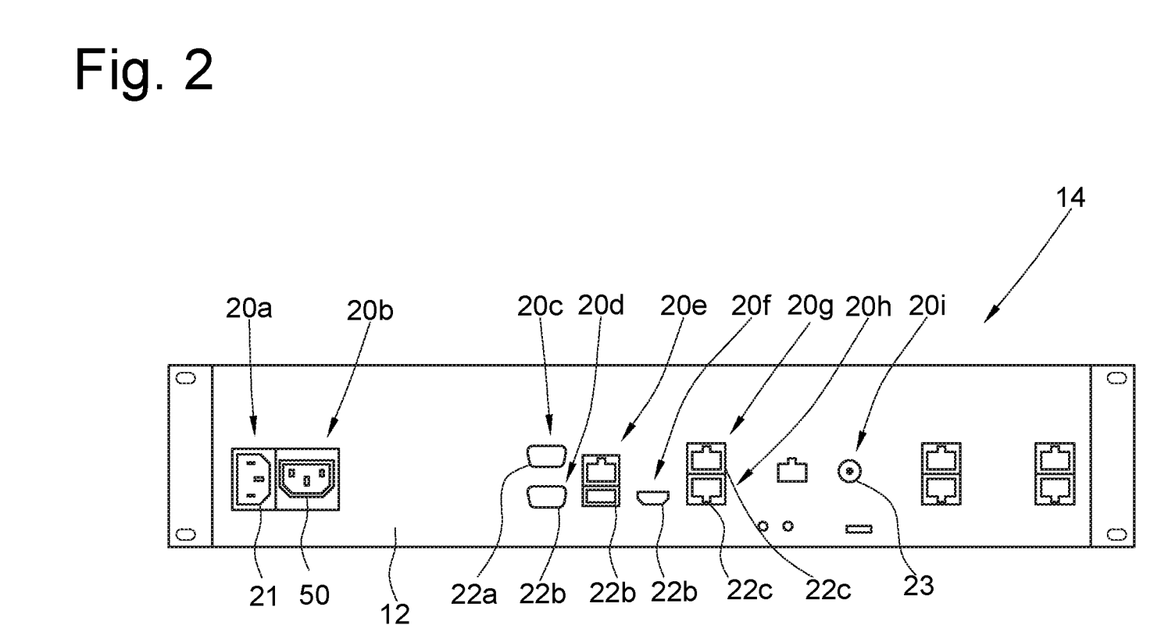
FIG. 2 shows the communication station in a schematic rear view, depicting the housing rear side.

As shown in FIG. 1 the exemplary embodiment of the communication station 10 according to the invention comprises a housing 12 with a housing front 13 and a housing rear side 14 that is depicted in FIG. 2.

A plurality of operating elements 15*a*, 15*b*, 15*c* is on the housing front 13, wherein here only some of the operating elements are marked. In addition a plurality of displays 16*a*, 16*b*, 16*c*, 16*d* are on the front side 13. Advantageously each of the displays 16*a*, 16*b*, 16*c*, 16*d* is assigned to a group of several operating elements 15*a*, 15*b*, 15*c*, 15*d*.

In the embodiment of FIG. 1 each group of eight operating elements 15*a*, 15*b*, 15*c*, 15*d* has one display assigned to it.

In the embodiment of FIG. 1 the communication station 10 comprises operating elements 15*a*, 15*b*, 15*c*, 15*d* in the form of selector keys 17*a*, 17*b*, 17*c*, 17*d*. The selector keys may comprise an actuating element that is shiftable starting from its central position similar to a lever, into a first switching position or alternatively into a second switching position. The actuating element may for example, with reference to FIG. 1, be actuated downwardly or upwardly in order to assume either a speaking mode or a listening mode.

The operating elements 15*a*, 15*b*, 15*c*, 15*d*, 17*a*, 17*b*, 17*c*, 17*d* are programmable, i.e. each of the selector keys 17*a*, 17*b*, 17*c*, 17*d* may have a certain communication station of the intercom network 11 assigned to it. For example, the selector key 17*c* of the communication station 10 of FIG. 1 may have the communication station 18*a* of the intercom network 11 of FIG. 3 assigned to it. By actuating this selector key 17c the operator of the communication station 10 of FIG. 1 can establish a direct listening connection or a direct speaking connection to the communication station 18a. The selector key 17b correspondingly may be connected to another communication station 18b of the audio network 11 of FIG. 3.

The number of communication stations 10, 18a, 18b connected to a switching station 19 can be any random number and this number is frequently very large.

According to the embodiment of FIG. 1 provision is made for a total of four groups of respectively eight selector keys or operating elements 17a, 17b, 17c, 15a, 15b, 15c at the communication station 10. A total of thirty-two different subscribers of an intercom network 11 can therefore be addressed from this communication station 10. However, the operating elements 15a, 15b, 15c as well as the selector keys 15a, 15b, 15c can have multiple functions assigned to them so that for example starting from different function levels two-times or even three-times thirty-two different subscribers of the intercom network can be addressed.

Apart from a direct call from a certain other communication station, be it listening-based or speaking-based, the operating elements 15a, 15b, 15c may also permit other functions such as group calls.

The operating elements 15a, 15b, 15c are also programmable. To this end each individual selector key 17a, 17b, 17c or each individual operating element 15a, 15b, 15c may have a certain parameter or a number of different parameters assigned to it. For example individual loudness values may be set for individual operating elements 15a, 15b, 15c. Also the buttons or operating elements 15a, 15b, 15c, 17a, 17b, 17c may have names, numbers, labels, abbreviations or other parameters or functionalities assigned to them.

A number of further elements and ports are moreover on the housing front 13. In FIG. 1 for example a microphone 44 and a loudspeaker 24 arranged hidden from view are on the front side 13. An opening 28a, 28b in form of a slit 30 provided for this purpose is for the sound outlet of the sound chosen by the loudspeaker 24.

Furthermore a port 45 for the microphone and a port 46 for connecting a headset are provided. Also a plurality of further ports and/or operating elements, controls, potentiometers and/or also additional displays may be provided. For completeness sake USB ports 52a, 52b on the housing front are also mentioned.

The housing front 13 has a footprint 33 which is altogether square. On the lateral edges 34a, 34b of the footprint lateral attachment sections 42a, 42b are which have openings 43. This allows the communication station 10 to be fastened to a mounting frame, i.e. a so-called rack, not shown, wherein the openings 43 are provided for receiving the fastening elements such as screws.

The housing front 13 thus provides a surface 53, on which a plurality of ports and elements can be arranged. The connecting elements accommodated there are in close proximity to each other.

The housing rear side 14 also has a plurality of ports 20a, 20b, 20c, 20d, 20e, 20f, 20g, 20h, 20i on it. Provision is for example made for data cable ports 22a, 22b, 22c, a BNC port 23, a voltage supply port 21 and a network voltage extension port 50. In particular, the housing rear side 14 is also used for connecting the interconnecting lines 48a, 48b, 48c that connect the respective communication station 10 and the switching station 19.

The housing 12 of the communication station 10 is essentially shaped in the form of a cube and comprises a bottom wall 55, a ceiling wall 56 and four side walls. The dimensions of the housing 12, the height HG of the housing 12 and also the width BG of the housing are altogether predefined, corresponding to an accommodation space in a mounting frame or rack not shown. The surface 53 for accommodating and positioning the operating elements 15a, 15b, 15c, 17a, 17b, 17c and connections 52a, b, 36, 45 as well as further elements 44, 28, 30 or further function devices is, insofar, limited and predefined.

Each of the displays 16a, 16b, 16c, 16d and of course further additional displays at the communication station 10 in FIG. 1 that are not shown, are configured as touchscreen displays. This means that each display can indicate information as is normal for a conventional display and can also provide for the possibility of an operator entering information or data on the display by means of actuation. In order to enter information it is necessary that an operator moves one or more fingers close to a respective switch panel or switch surface on the display or touches the same.

According to FIG. 3 the display 16c is depicted that is in a first function state. The first function state is marked with 68.

Figure 4:
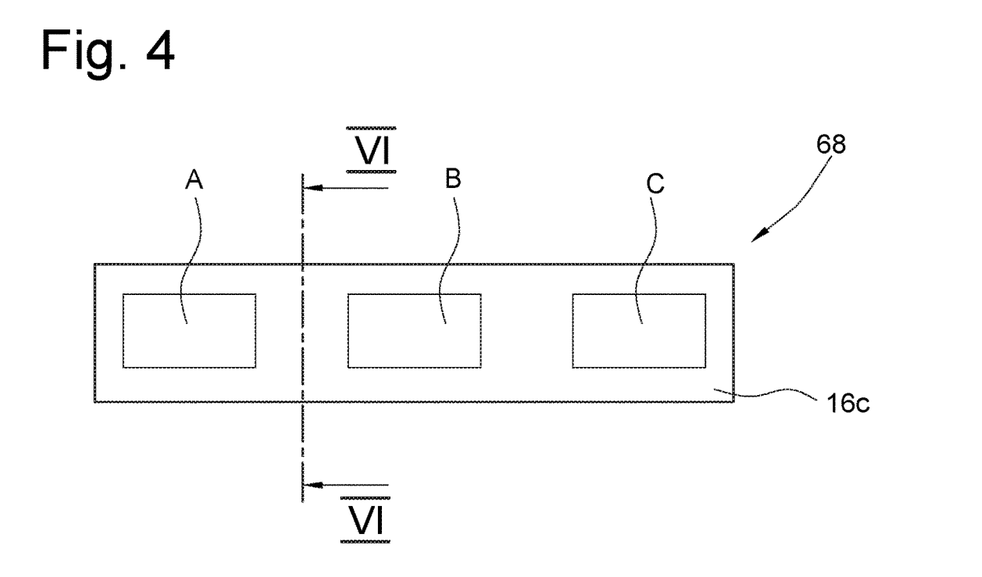
FIG. 4 shows, in a schematic enlarged detail view, the display 16*c* of the communication station of FIG. 1, in a first function state.

In this first function state it may be provided that the display 16c in FIG. 4 displays information of a first kind. To this end information display fields A, B, C are provided. The information A, B, C of the first kind may be associated with a certain selector key, e.g. the selector key 17d of the communication station 10 of FIG. 1. For example the information A, B, C of the first kind may comprise the parameter values set for this selector key 17d, such as loudness values.

The information A of a first kind may for example be a loudness value for the selector key 17d.

The information B of the first kind may contain the information, to which other communication station of the intercom network the current communication station 10 is connected, when the selector key 17d is pressed. For example the first-kind information B may be the name used in the intercom network 11, of this selected other communication station (e.g. the communication station 18a of the intercom network in FIG. 3). For example, the value here may be "stage direction".

The information value C my show as first-kind information the name of the operator who is working at the communication station 18a. If for example the communication station 18a is called "stage direction", the name "Thomas" may e.g. appear in the field C.

The display 16c, in the first function state, may therefore show the first-kind information A, B, C.

Figure 5:
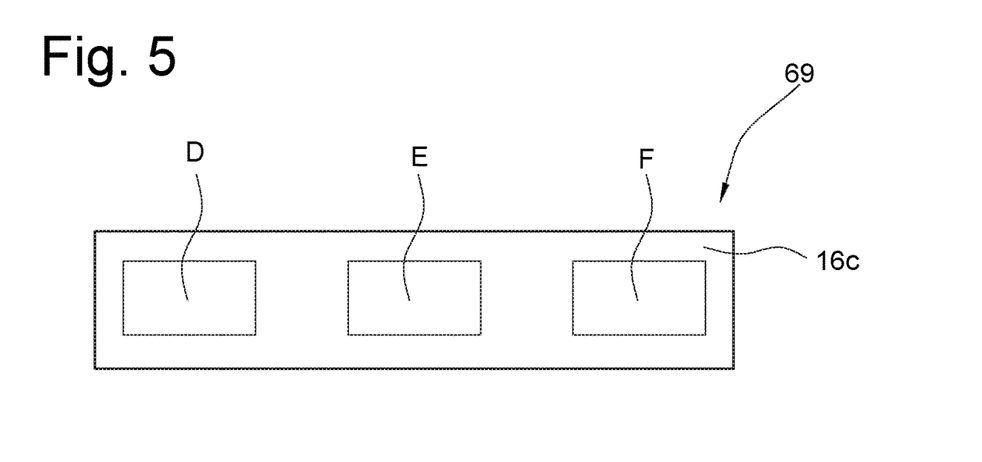
FIG. 5 shows the display in a view as per FIG. 4, in a second function state.

The communication station according to the invention comprises a mechanism which makes it possible to switch the display 16a from the first function state shown in FIG. 1 into a second function state 69 shown in FIG. 5. The details of how this is achieved will be explained at a later stage.

Using the embodiment depicted in FIG. 5 it is initially described that the display 16c, when it has reached its second function state 69, displays the second-kind information D, E, F for the same function button 17d. FIG. 5 depicts three display fields D, E, F, via which other additional information is now displayed which also relates to the selector key 17d. For example, the second-kind information D here consists of an indication of the amount of time, during which there already exists an audio connection between the communication station 10 and the further communication station 18a connected by actuating the selector key 17d of the communication station 10.

In the field E the second-kind information displayed here may e.g. be the information, how much time remains available to the operators of the communication stations 10 and 18a for continuing the audio connection. For example, this may take the form of a count-down timer that indicates to the operator the remaining talking time.

In the information field F a second-kind information F may for example be displayed, which indicates that another operator of the intercom network 11 is presently attempting to establish an audio connection to the user of the communication station 10.

It becomes, at any rate, clear that as a result of a switching operation of the display 16c from the first function state 68 as per FIG. 3 into a second function state 69 as per FIG. 5 other information is displayed, i.e. second-kind information as per FIG. 5 instead of first-kind information A, B, C as per FIG. 4. As a result of the display 16c being switched from the first function state 68 into the second function state 59 another display level is achieved.

In order to carry out the switching operation, a switch could, for example, be provided on the housing front 13, which permits a switch-over or switching between different function levels. The invention, however, takes a completely different route and provides that the touchscreen display 16c itself acts as a switch and can be moved along a movement direction 59 (see FIG. 7).

Figure 6:
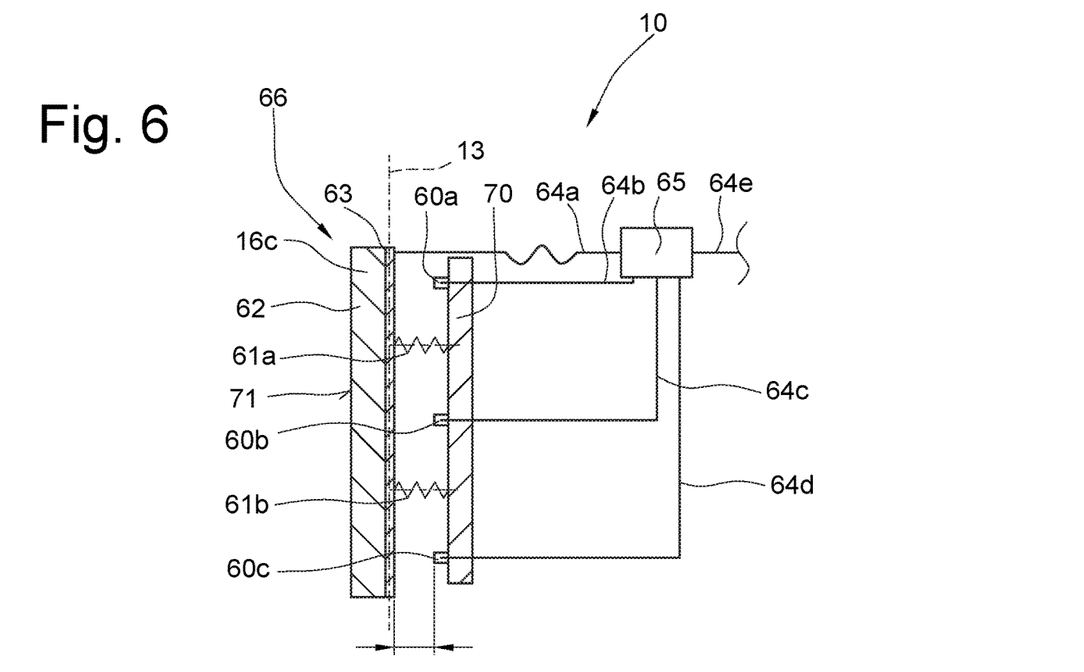
FIG. 6 shows the display of FIG. 4 in a partially cut schematic view roughly along cutting line VI-VI in FIG. 4, wherein additional electronic elements in the communication station such as sensors, a control, spring elements and signal lines are depicted.

FIG. 6 shows a partially cut schematic sectional view through the display 16c and an area of the communication station 10. The display 16c consists, for example, of a glass body 62 that may e.g. be shaped as a glass pane, and of a sensor layer 63 that on the one hand can detect the presence of a finger of a user in order to enter information, as is common with touchscreens. The sensor layer 63 is however also a display layer and is used to display information A, B, C, D, E, F on the display 16c.

Figure 7:
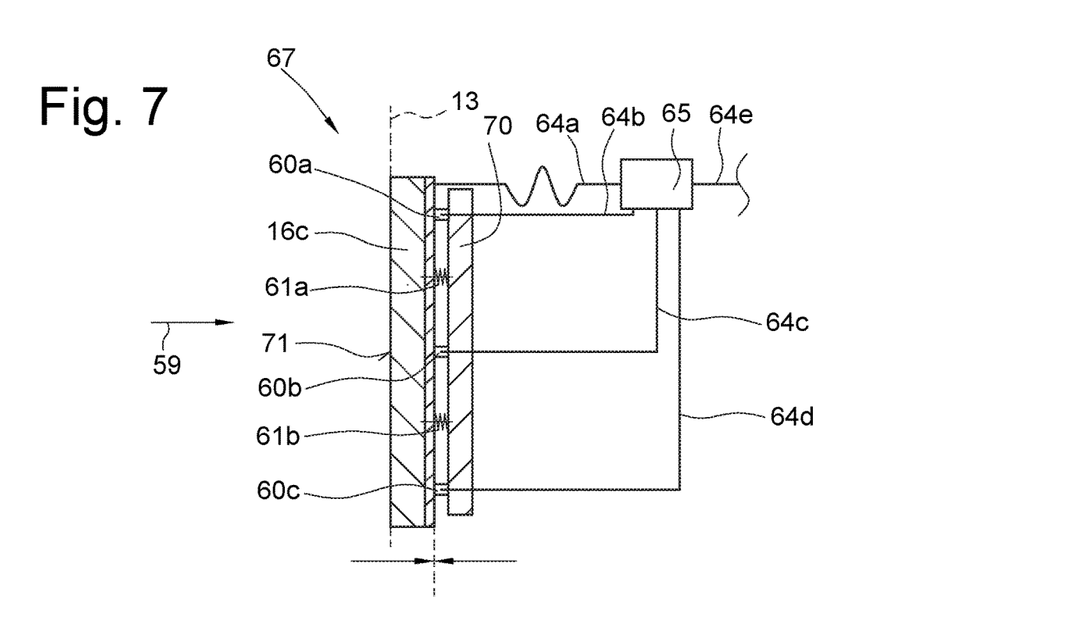
FIG. 7 shows the display in a view as per FIG. 6 in a second function state, corresponding to a reached switching position.

The sensor layer 63 or display layer and the glass body 62 that also may consist of a material other than glass, are connected to each other so as to move in the same way, and can be shifted along, or contrary to, the shifting direction 59 between a rest position 66 as per FIG. 6 and a switching position 67 as per FIG. 7. The rest position 66 corresponds to the first function state of the switching element 16c as per FIG. 4, and the working position or switching position 67 as per FIG. 7 corresponds to a second function state of the display 16c as per FIG. 5.

FIGS. 6 and 7 merely schematically make it clear that a number of sensors 60a, 60b, 60c are on a plate 70 or portion 70 fixed on the housing 12 of the communication station 10. The plate 70 is a mounting plate or mounting arrangement. This is fixed in relation to the housing front 13. The housing front 13 is not shown in FIG. 6, but merely indicated, extending for example roughly along the plane 13 shown as a dotted line in FIG. 6 and FIG. 7.

FIGS. 6 and 7 each show three sensors 60a, 60b, 60c, wherein with other embodiments only one single sensor 60 or more than three sensors may be provided for one display 16c.

FIGS. 6 and 7 schematically depict spring elements 61a, 61b that with one end are supported against the mounting plate 70 and with the other end against the display 16c. These spring elements are compression spring elements which urge the display 16c in direction of its rest position 66.

When the operator exerts a force along the shifting direction 59 upon the front surface 71 of the display 16c which acts against the operator of the communication station 10, the display can be shifted starting from the rest position 66 as per FIG. 6 in shifting direction 59 into the working position 67 as per FIG. 7.

The sensors 60a, 60b, 60c can detect such a shift. The sensors are connected via signal or control lines 64b, 64c, 64d to a component 65 that represents and/or may comprise a control or a computer unit of the communication station 10. The control 65 may in turn be connected via a signal line 64e to a further control of the communication station 10 that is not shown. Alternatively the element 65 may be the control or may form a control of the communication station 10.

The display 16c is also connected to the control 65 via a further signal line 64a. The control line 64a that is merely schematically shown just like the other control lines, can represent both the means for controlling the display 16c and for transmitting data entered on the display.

When starting from a rest position as per FIG. 6 the display is shifted, and at least one of the sensors 60a, 60b, 60c detects that the switching position 67 has been reached, the control 65 switches the display 16c from the first function state 68 as per FIG. 4 into the second function state 69 as per FIG. 5. The user is then shown second-kind information D, E, F.

Changing the function state from the second function state 69 as per FIG. 5 back into the first function state 68 as per FIG. 4 may e.g. be effected by again shifting the display 16c from the rest position 66 into the working position 67. The spring elements 61a, 61b may both be effective in shifting the display 16c back from the working position 67 into the rest position 66.

With a further design of the invention not depicted in the drawing, the display, on reaching the working position 67, can remain in this position. It may be necessary to once more build pressure or exert a force in order to ensure that the spring elements 61a, 61b initiate a return shift of the display 16c from the working position 67 into the rest position 66.

Next it will explained that the display 16c configured as a touchscreen display can also be used for entering information or data.

Let it be assumed that FIG. 4 shows again information to the operator which are marked as information A, B, C and that this is information of the first kind. The first-kind information A, B, C is represented merely as square input fields or switching fields in FIG. 4. When a user of the communication station 10 is confronted with the display 16c in a first function state as per FIG. 4, he can, on demand or if desired, make a selection and chose either the switching surface A or the switching surface B or the switching surface C. If, in the first function state 68 of the display as per FIG. 4, he selects for example the switching surface A, he can, in consequence of this selection, enter information on the touchscreen display 16c.

For example, in the first function state as per FIG. 4, the display 16c can provide a selection option for a selected selector key (e.g. the selector key 17d) with the switch fields A, B, C, as to whether the loudness value for this selector key 17b should be set to a first loudness value A, a second loudness value B which is higher than the first, or a very high third loudness value C which is even higher than the second. If the display 16c is in the first function state as per FIG. 4, first-kind data can be entered on the display via the switch fields A, B, C. The data input is transmitted via the signal line 64a as per FIG. 6 also to the control 65. The control 65 can store this data in a memory not shown or process the data in a different manner.

If however the operator of the communication station 10, due to exerting a force in shifting direction 59 as per FIG. 2 and in this way shifts the display 16c from the rest position 66 corresponding to the first function state into the working position 67 as per FIG. 7, the control 65 switches the display 16c into the second function state which is shown in FIG. 5. FIG. 5 now shows the switch fields D, E, F, by means of which second-kind data can be entered. Whilst for example the input fields A, B, C of display 16c, in the first function state as per FIG. 4, show loudness values 1, 2, 3, the input fields D, E, F show other, e.g. higher loudness values 4, 5, 6. The operator can thus set a loudness value 5 by e.g. actuating the switching surface E.

Therefore the operator is able, directly on the touchscreen display 16c, on which data input is effected, to reach a further second function level or another function state 69 of the display 16c by shifting the entire display in shifting direction 59, i.e. along a normal vector which extends perpendicular to the planar housing front 13.

The invention covers numerous further embodiments: for example provision made be made for a so-called slider to be on the display 16c that, as is common on touchscreen displays, permits to continuously set a parameter or another value by means of guiding a fingertip. This may include merely showing the slider of the display 16c in the first function state, but not permitting it to function until the operator shifts the display 16c from the rest position 66 into the switching position 67. This then triggers activation of the slider.

It is also covered by the invention if the display 16c merely shows information in a first function state and then, after reaching the switching position, allows the input of information or of data.

Finally it is covered by the invention if the display, in a first function state, operates as a touchscreen display, is then switched into a second function state 69 by once actuating and shifting it into the switching position, and is then transferred into a third function state by again actuating the display 16c, in that it is shifted into the switching position 67.

Further repeated actuations, including within pre-set short time spans, such as within a few seconds or split seconds, can cause even further additional function states to be reached.

The proposed switchability of the display results in a particularly comfortable operation of a communication station 10.

Next, particular details of a display 16 will now be described with reference to the embodiments of FIGS. 8 to 10.

Figure 8:
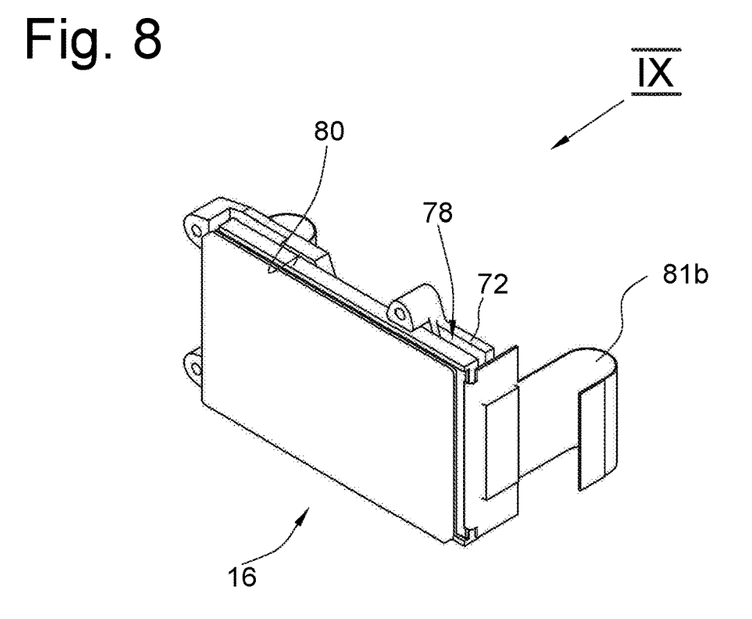
FIG. 8 shows an embodiment of a display of a communication station according to the invention in a perspective schematic detail view.
Figure 9:
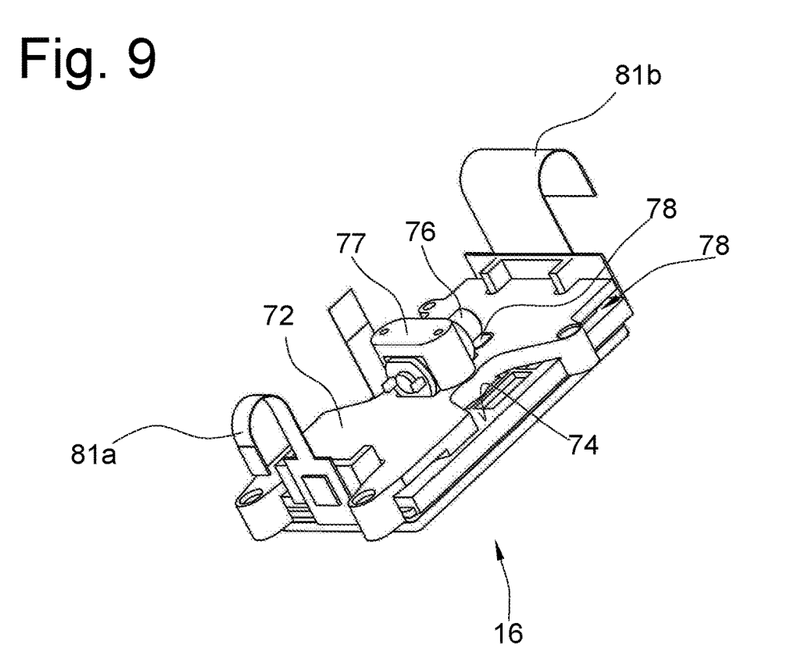
FIG. 9 shows the display of FIG. 8 in a rear view, as per arrow IX in FIG. 8.

In FIG. 8 an exemplary embodiment of a display 16 is shown in a perspective schematic view that is intended for use in one of the above-described communication stations. The display 16 has an essentially square shape and comprises two data cables 81a, 81b, via which e.g. information such as display information or signals can be transmitted from a control of a communication station to the display or vice versa.

Figure 10:
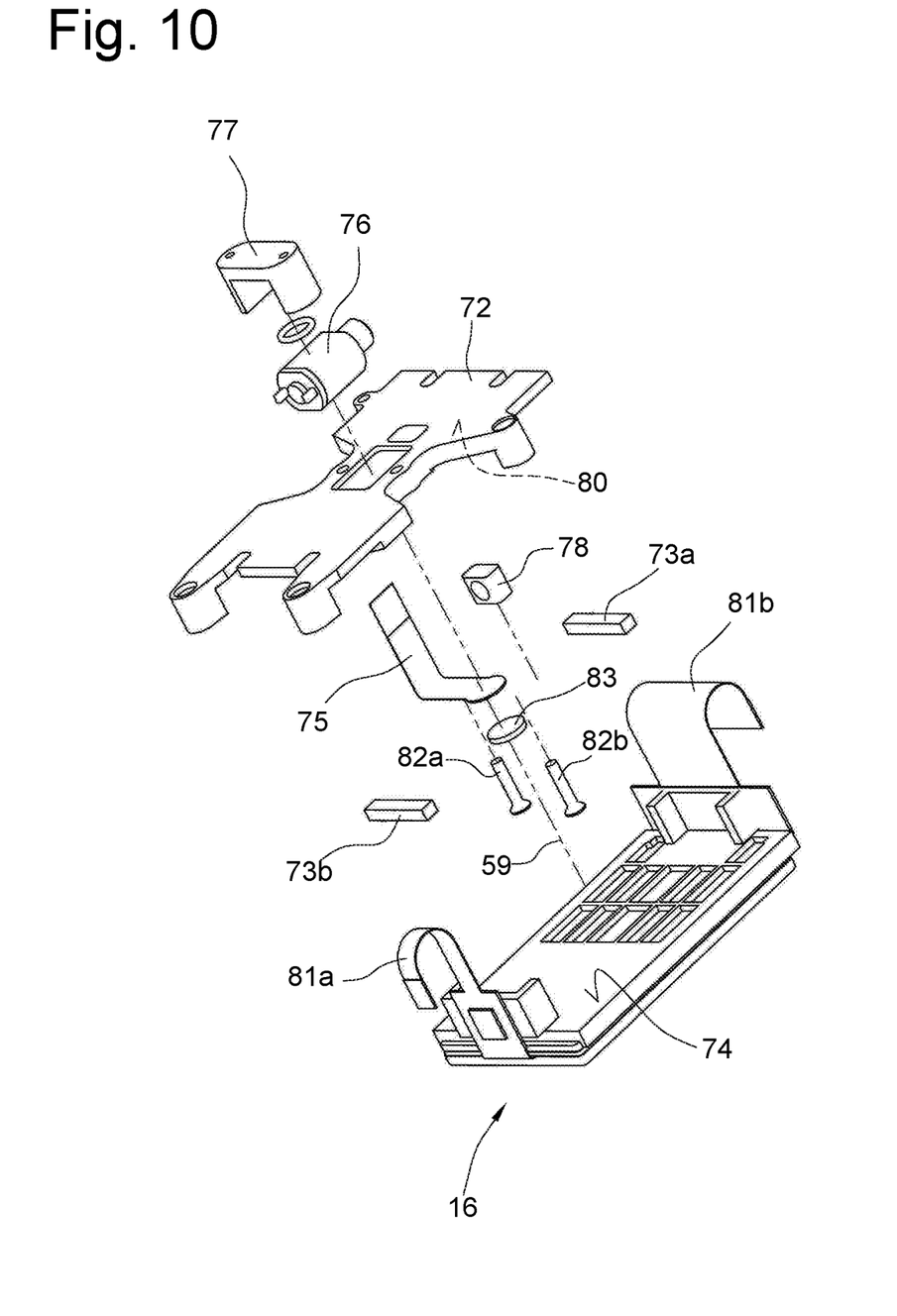
FIG. 10 shows the display of FIG. 9 in a schematic explosive view.

As is best recognizable in the explosive view of FIG. 10, the display 16 has a display holder 72 associated with it. This is firmly fixed relative to the housing front 13 of a communication station 10.

The display 16 is held on the display holder 72 so as to be axially shiftable in axial direction 59. Fixing screws indicated at 82a, 82b for example ensure that the display 16 on the holder 72 cannot be lost.

When assembled there is a movement space 78 between a rear side 74 of the display 16 and the front side 80 of the holder 72. In addition two elastic, at least slightly compressible elements 73a, 73b are between the rear side 74 of the display 16 and the front side 80 of the holder 72. As can be seen in the embodiment of FIG. 10 two strip-like elements marked 73a and 73b are depicted. These may, for example, be strips of a double adhesive tape. These can be compressed on the one hand and insofar ensure that the display 16 is spaced apart from the holder 72, but at the same time due to the compressibility ensure a restoring force.

A motor 76 with a gyrating mass is attached to the holder 72 with the aid of a bracket 77. The motor 76 cooperates with an anvil element 78 which can impact the rear side 74 of the display 16.

A sensor element 83, in particular of a so-called bumper type, cooperates with a sensor device 75, in particular in the form of a FSR element (force-sensing resistor). This may, for example, be a component the electric resistance of which is subject to change under the influence of a force. Alternatively however, the sensor 75 may be a strain gauge, a piezo crystal or any other element which absorbs and detects a force or a slight shift and which can, for example, convert an electrical voltage.

In the simplest case the sensor element 75 can detect the force exerted upon the sensors 75, 83 as a result of an axial shift of the display 16 and this may be directly converted into an electrical signal. To this end an electrical voltage divider with a connected A/D (analogue/digital) converter unit for example can generate a voltage which is fed to the motor 76. The motor, upon receiving such a signal, can actuate the gyrating mass, rotate it about a rotational angle of e.g. 180° and thereby rotate or actuate an anvil which in turn impacts the display.

This permits a tactile feedback to the display for the user as a result of actuating the display 16 in terms of an axial shift.

When insofar the operator actuates the display 16 in terms of an axial shift, this can be detected by the sensor 75, 83 and leads to a tactile response via motor and gyrating mass 76, anvil 78 and display 16. The user can thus be signaled that an axial shift has taken place in terms of a proper switch actuation.

The invention claimed is:

1. In an intercom network, a communication station comprising:
   a housing with a housing front and a housing rear side,
   a plurality of operating elements including selector keys on the housing front; and
   a touchscreen display on the housing front, the communication station, as a result of an operator actuating one of the operating elements, providing a direct listening and/or speaking connection to another selected communication station of the intercom network, the display displaying, in a first function state of the display, information of a first kind and/or allowing data of a first kind to be entered on the display, the information and/or data relating to at least one of the operating elements, the improvement wherein
   the display can be moved relative to the housing between a rest position in which the display is in the first function state and a switching position, and
   as a result of moving the display relative to the housing into the switching position, the display enters into a second function state, in which information of a second kind can be displayed and/or data of a second kind can be entered on the display, the information and/or data relating to at least one of the operating elements.

2. The communication station according to claim 1, wherein the housing is shaped as a parallelepiped or essentially shaped as a parallelepiped.

3. The communication station according to claim 1, wherein at least one selector key is designed to be programmable.

4. The communication station according to claim 1, wherein the communication station comprises a plurality of touchscreen displays that can each be shifted between the rest position and the switching position.

5. The communication station according to claim 1, further comprising:
a sensor for detecting shifting of the display into the switching position.

6. The communication station according to claim 5, wherein the communication station further comprises:
a control associated with the sensor.

7. The communication station according to claim 6, wherein the control switches the display from its first function state into its second function state.

8. The communication station according to claim 6, wherein the control switches the display from its first function state into its second function state while the display is being briefly or continuously shifted into the switching position.

9. The communication station according to claim 1, wherein the control switches the display from its first function state into its second function state for a one-time shift into the switching position.

10. The communication station according to claim 5, wherein the control switches the display from its first function state into a third function state while shifting the display repeatedly in short succession into the switching position.

11. The communication station according to claim 1, wherein the display is designed to be shifted as a whole or section-wise.

12. The communication station according to claim 1, further comprising:
a plurality of ports are on the housing rear side.

13. The communication station according to claim 1, further comprising:
a loudspeaker and/or a port for a loudspeaker fixed on the housing front.

14. The communication station according to claim 1, further comprising:
a microphone and/or a port for a microphone on the housing front.

15. The communication station according to claim 1, further comprising:
a port for a headset on the housing front.

* * * * *